United States Patent [19]

Kitano et al.

[11] Patent Number: 5,362,225

[45] Date of Patent: Nov. 8, 1994

[54] SUPPORT MECHANISM FOR FORMING DIES

[75] Inventors: Minoru Kitano, Nagoya; Kenji Mitsui, Okazaki; Hozumi Tanaka; Koji Kazama, both of Toyota, all of Japan

[73] Assignee: Kyokuto Seiki Kabushiki Kaisha, Aichi, Japan

[21] Appl. No.: 97,240

[22] Filed: Jul. 27, 1993

[30] Foreign Application Priority Data

Jul. 27, 1992 [JP] Japan .................................. 4-199681

[51] Int. Cl.⁵ ............................................ B29C 33/26
[52] U.S. Cl. ................................. 425/472; 425/450.1; 425/451.5
[58] Field of Search .................. 425/409, 450.1, 451.5, 425/454, 472

[56] References Cited

U.S. PATENT DOCUMENTS

| 4,008,990 | 2/1977 | Hiemer et al. | 425/454 |
| 4,080,145 | 3/1978 | Jung | 425/451.5 |
| 4,354,819 | 10/1982 | Wirz | 425/450.1 |
| 4,943,223 | 7/1990 | Panaroni | 425/454 |

FOREIGN PATENT DOCUMENTS

| 2300665 | 10/1976 | France | 425/450.1 |
| 61-49812 | 3/1986 | Japan | 425/450.1 |
| 3-4013 | 1/1991 | Japan . | |
| 3-36004 | 2/1991 | Japan | 425/472 |

*Primary Examiner*—James Mackey
*Attorney, Agent, or Firm*—Fisher & Associates

[57] ABSTRACT

A support mechanism for supporting thereon a set of upper and lower forming dies to be opened and closed in a forming process. The support mechanism includes a base structure of mounting thereon the lower forming die, a pair of opposed upright side plates fixedly mounted on the base structure in parallel to one another, a pair of guide tracks provided on the respective inside faces of the side plates, a pair of actuators mounted on the base structure at a position adjacent the respective side plates, a movable support frame arranged between the side plates and located above the lower forming die on the base structure for supporting the upper forming die thereon, the support frame having a pair of support shafts secured to its opposite sides and slidably engaged with the guide tracks, and a pair of link mechanisms arranged to support thereon the support shafts of the support frame and to transmit the motion of the actuators to the support shafts to move the support frame along the guide tracks.

4 Claims, 5 Drawing Sheets

SUPPORT MECHANISM FOR FORMING DIES

BACKGROUND OF THE INVENTION

1. Field of the Invention

The present invention relates to a support mechanism for supporting thereon a set of upper and lower forming dies to be opened and closed in a forming process of synthetic resin products such instrument panels, safety pads or the like for use in automotive vehicles.

2. Description of the Prior Art

Disclosed in Japanese Patent Publication No. 3-4013 is a support mechanism for a set of upper and lower forming dies which includes a base structure for fixedly mounting thereon the lower forming die, a pair of opposed upright side plates fixed to the base structure in parallel to one another and arranged at each side of the lower forming die, and a movable support frame disposed between the side plates and located above the lower forming die for supporting thereon the upper forming die. The side plates each are provided with a guide slot along which a guide rail in the form of a rack bar is attached, and the movable support frame is provided thereon with an electric motor and with a lateral drive shaft which is slidably engaged at its opposite ends with the guide slots of the opposed side plates. The movable support frame is further provided with a pair of guide rods secured to its opposite sides and slidably engaged with the respective guide slots of the side plates. The drive shall is provided thereon with a pair of axially spaced pinions which are in meshing engagement with the respective guide rails on the side plates. The electric motor is drivingly connected to the drive shaft through a reduction mechanism. In operation, the drive torque of the electric motor is transmitted to the drive shaft through the reduction mechanism, and in turn, the pinions are driven to rotate along the guide rails so that the movable support frame is moved upward along the guide rail is to separate the upper forming die from the lower forming die and open it for entry of an article to be molded into the lower forming die.

In the support mechanism described above, however, the electric motor and associated torque transmission parts are mounted on the movable support frame. With such arrangement of the component parts, the support mechanism becomes high and large in size, and the upper forming die is positioned apart from the operator when it has been opened. This results in difficulty for the operator in setting an article to be formed. Additionally, the movable support frame becomes heavy, resulting in an increase of the power for operation of the support mechanism and a slowdown of operation speed of tile same.

SUMMARY OF THE INVENTION

It is, therefore, a primary object of the present invention to provide an improved support mechanism for the forming dies which is capable of overcoming the problems described above.

According to the present invention, there is provided a support mechanism for supporting thereon a set of upper and lower forming dies to be opened and closed in a forming process, which comprises a base structure for mounting thereon the lower forming die; a pair of opposed upright side plates fixedly mounted on the base structure in parallel to one another; a pair of guide tracks provided on the respective inside faces of the upright side plates, the guide tracks each being composed of a pair of parallel guide rails; a pair of actuators mounted on the base structure at a position adjacent the respective upright side plates; a movable support frame arranged between the upright side plates and located above the lower forming die on the base structure for supporting the upper forming die thereon, the support frame having a pair of support shafts secured to its opposite sides and a pair of guide bars secured to its opposite sides and slidably engaged with each groove formed by the respective parallel guide rails of the guide tracks; and means for supporting thereon the support shafts of the support frame and transmitting the motion of the actuators to the support shafts to move the support frame along the tracks under guidance of the guide bars.

BRIEF DESCRIPTION OF THE DRAWINGS

Other objects, features and advantages of the present invention will be more readily appreciated from the following detailed description of a preferred embodiment thereof when taken together with tile accompanying drawings, in which.

DESCRIPTION Of THE PREFERRED EMBODIMENT

Figure 1:
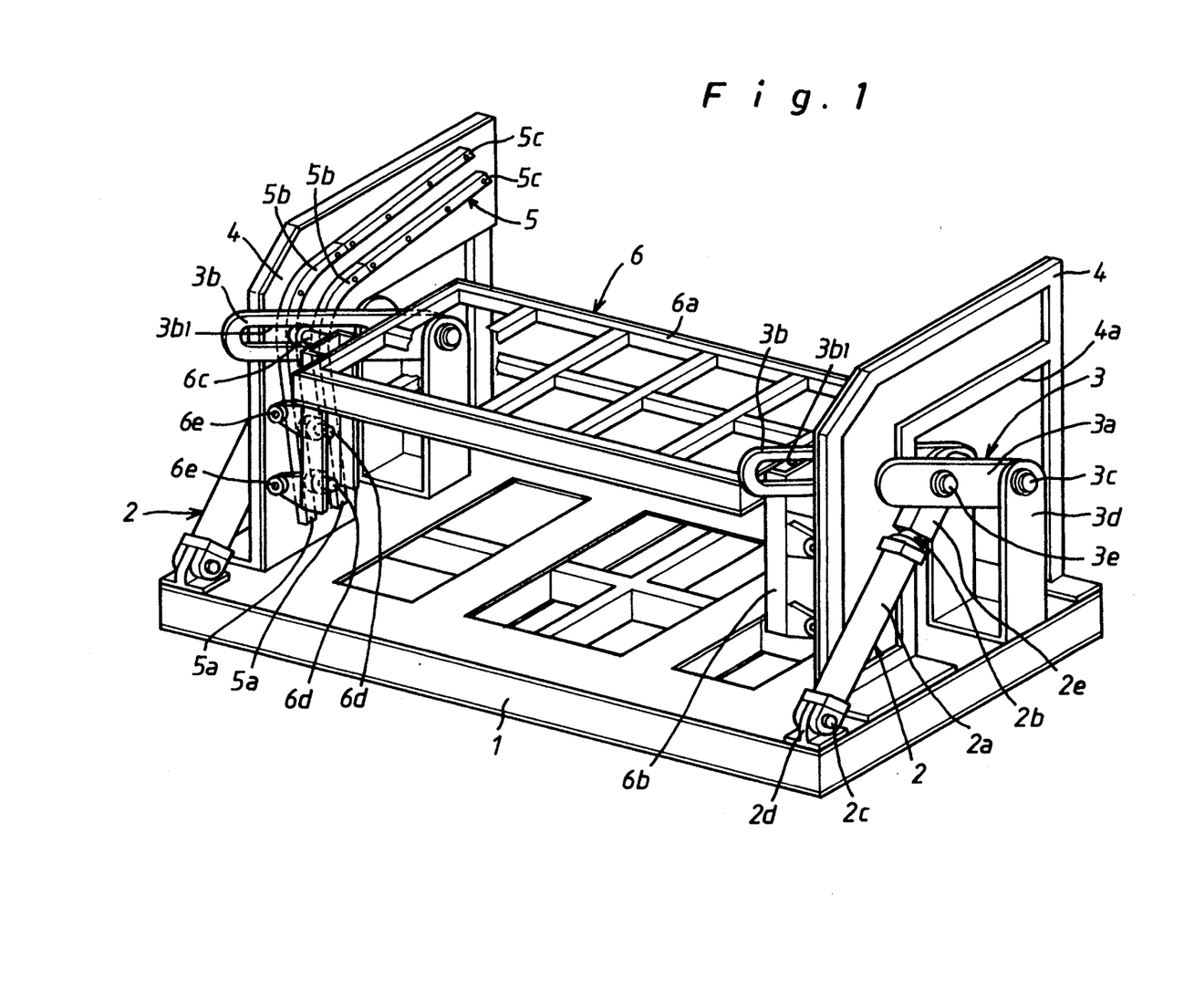
FIG. 1 is a full perspective view of a support mechanism for a set of upper and lower forming dies in accordance with the present invention.
Figure 2:
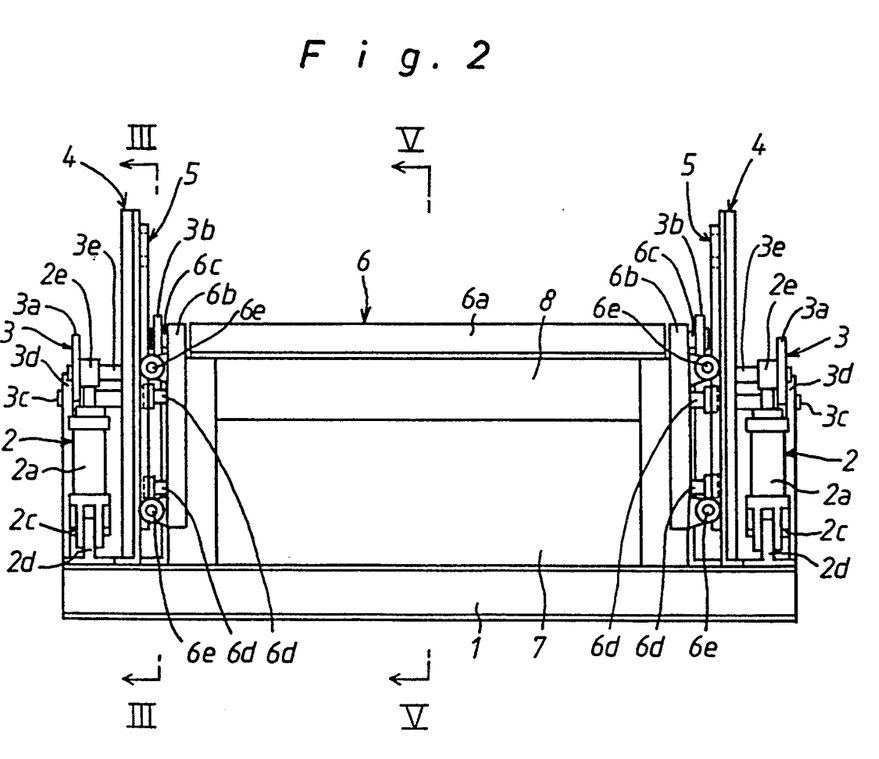
FIG. 2 is a front view of the support mechanism shown in FIG. 1 with the forming dies mounted thereon.
Figure 3:
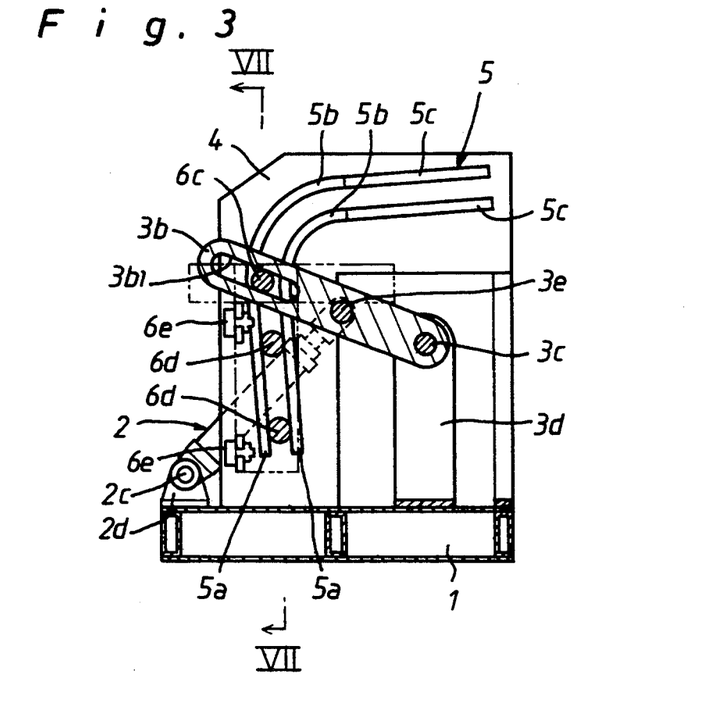
FIG. 3 is a sectional view of tile support mechanism taken along the line III—III in FIG. 2 in a condition where the upper forming die is half opened.
Figure 4:
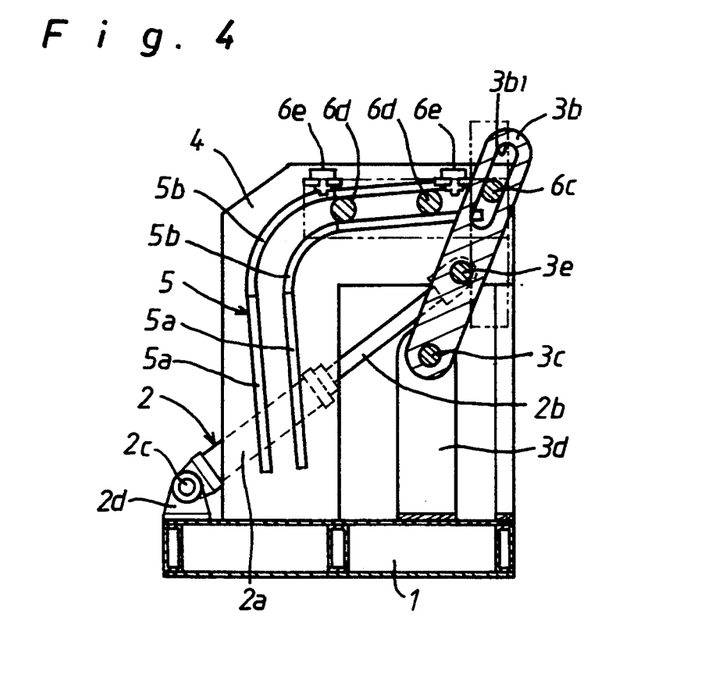
FIG. 4 is a sectional view of the support mechanism taken along the line III—III in FIG. 2 in a condition where the upper forming die is fully opened.

Referring now to the drawings, FIGS. 1 and 2 illustrate a support mechanism for supporting thereon a set of upper and lower forming dies 8, 7 to be opened and closed in a forming process of a synthetic resin product (not shown). The support mechanism includes a stationary base structure 1 for mounting thereon tile lower molding die 7, a pair of laterally spaced hydraulic actuators 2, 2 pivotally mounted on the base structure at their lower ends, a pair of opposed upright side plates 4, 4 rigidly mounted on the base structure 1 in parallel to one another at each inside of the hydraulic actuators 2, 2, and a movable support frame 6 disposed between the upright side plates 4, 4 for supporting thereon the upper forming die 8, which is placed on the lower forming die 7 as shown in FIG. 2 during the forming process of the synthetic resin product. The arrangement of the support mechanism on one side of the movable support frame 6 is substantially in symmetrical relationship with that on the other side of the support frame 6 such that a detailed description of the one side of support frame 6 is believed necessary.

The hydraulic actuators 2 each are composed of a hydraulic cylinder 2a, a piston (not shown) and a piston rod 2b. The lower end of hydraulic cylinder 2a is pivotally mounted on the base structure 1 by means of a support shaft 2c and a bracket 2d. The piston rod 2b has a joint head 2e pivotally connected to an outside link member 3a and an inside link member 3b at their intermediate portions by means of a pivot shaft 3e. The link members 3a and 3b are arranged in parallel to one another and rotatably supported on a support shaft 3c which is carried on an upright bracket 3d of U-shaped cross-section secured to the base structure 1. In addition, the inside link member 3b has a swingable portion formed with an elongated hole 3b1. In such an arrangement as described above, the translation of piston rod 2b is transformed into a rotary motion of link members 3a and 3b about the support shaft 3c. In FIGS. 1 and 2, the reference numeral 3 designates a linkage mechanism composed of the link members 3a, 3b, support shaft 3c and pivot shaft 3e.

Figure 7:
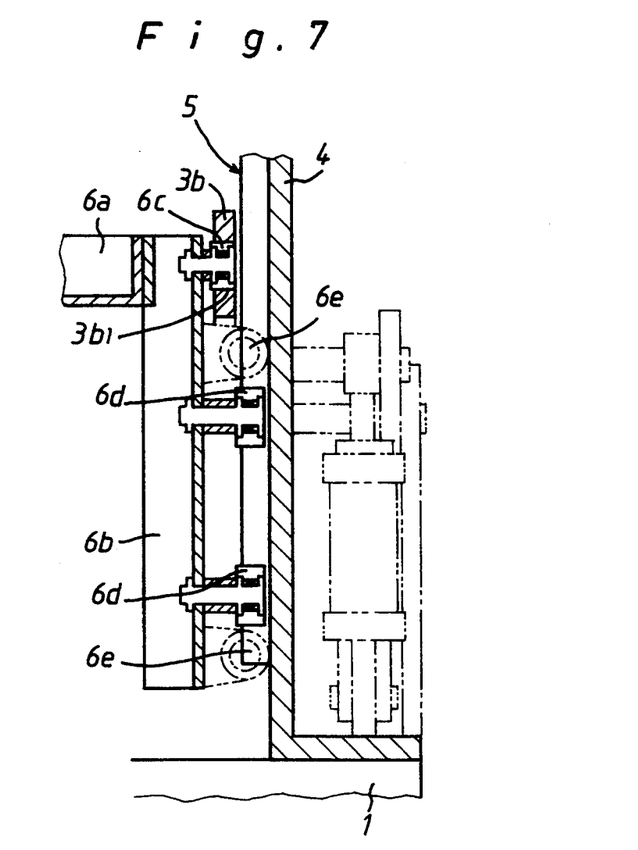
FIG. 7 is an enlarged partly sectional view of the support mechanism taken along the line VII—VII in FIG. 3.

The upright side plates 4 each are formed with an opening 4a in which the rotary movement of the pivot shaft 3e is permitted in operation of the hydraulic actuator 2. The upright side plates 4 each are provided with a guide track 5 consisting of a pair of parallel rails bolted on its inside surface. The leftside guide track 5 is formed symmetrically with the rightside guide track 5 and has a pair of lower linear rails 5a, a pair of intermediate curved rails 5b and a pair of upper linear rails 5c. The movable support frame 6 has a rectangular frame body 6a, a pair of downwardly extending struts 6b, 6b fixed to the opposite side faces of frame body 6a, and a pair of outwardly extending support shafts 6c, 6c fixed to the respective struts 6b, 6b. The support shafts 6c, 6c each are provided thereon with a columnar roller which is slidably engaged with the respective elongated holes 3b1, 3b1 of link members 3b, 3b for suspending the movable frame 6 therefrom. (see FIG. 7)

The movable support frame 6 is further provided with a pair of vertically spaced guide bars 6d, 6d fixed to the respective struts 6b, 6b. The guide bars 6d, 6d each provided thereon with a columnar roller which is slidably engaged with a guide groove formed by each pair of guide rails 5a, 5b and 5c for guiding movements of the support frame 6 along the pair of guide tracks 5, 5. The movable support frame 6 is further provided with a pair of vertically spaced guide rollers 6e, 6e which are rotatably carried by a pair of vertically spaced brackets secured to the respective struts 6b, 6b and maintained in contact with the respective inside surfaces of upright side plates 4, 4.

Figure 5:
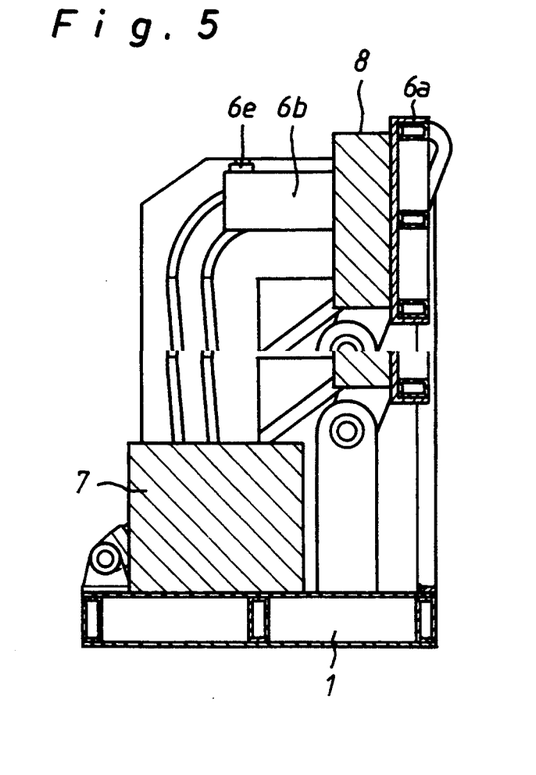
FIG. 5 is a sectional view of the support mechanism taken along the line V—V in FIG. 2 in a condition where the upper forming die is fully opened.

In use of the support mechanism described above, the lower forming die 7 is positioned on the base structure 1, while the upper forming die 8 is fixedly mounted to the bottom of rectangular frame body 6 by means of fitting means (not shown) and placed on the lower forming die 7 as shown in FIG. 2. To open the lower forming die 7, the hydraulic cylinders 2a, 2a are activated by hydraulic pressure applied thereto in a forward direction to translate the piston rods 2b upwardly thereby to cause upward rotation of the link members 3b, 3b about the support shafts 3c, 3c. Thus, the support frame 6 is lifted by the link members 3b, 3b to separate the upper forming die 8 from the lower forming die 7. In this instance, the support shafts 6c, 6c of frame body 6a are moved upward by engagement with the respective elongated holes 3b1, 3b1 of link members 3b, 3b, and the guide bars 6d, 6d are moved along the guide groove formed by each pair of the guide rails 5a, 5b and 5c. Accordingly, the upper forming die 8 is first lifted upward, then turned backward and finally positioned in a vertical direction, as shown in FIG. 5. During upward movement of the upper forming die 8, the guide rollers 6e, 6e are rotated by engagement with the respective inside surfaces of the upright side plates 4, 4 to prevent lateral movements of the support frame 6.

Figure 6:
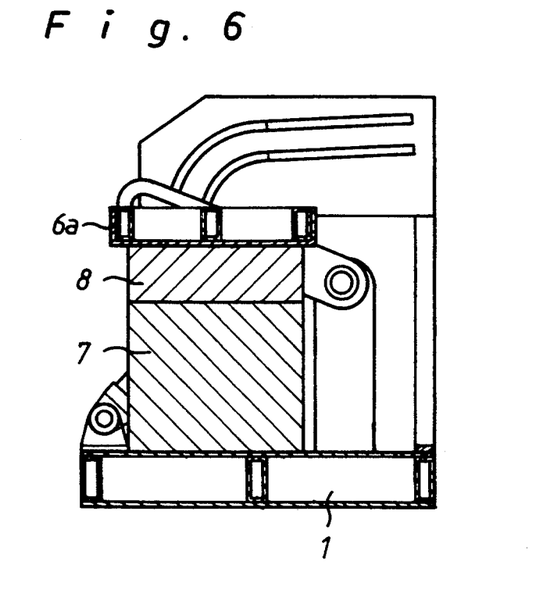
FIG. 6 is a sectional view of the support mechanism taken along the line V—V in FIG. 2 in a condition where the upper forming die is fully closed.

To close the lower forming die 7 with the upper forming die 8, the hydraulic cylinders 2a, 2a are activated by hydraulic pressure applied applied thereto in a backward direction to move the piston rod 2b downwardly thereby to cause downward rotation of the link members 3b, 3b about the support shafts 3c, 3c. Thus, the support frame 6 is moved down forwardly by the link members 3b, 3b to place the upper forming die 8 on the lower forming die 7 as shown in FIG. 6. In this instance, the downward movement of the support frame 6 is guided by the respective guide tracks 5, 5 as in the same manner as described above.

In actual practices of the present invention, the hydraulic cylinders 2, 2 may be replaced with a pneumatically or electrically operated actuator, respectively. Although In the above embodiment, the hydraulic cylinders 2, 2 of the translation type have been adapted to rotate the support frame 6 with the upper forming die 8 at an angle of 90 degrees with respect to the lower forming die 7, a rotary actuator may be substituted for the respective hydraulic cylinders 2, 2 to rotate the support frame 6 with the upper forming die 8 at an angle of 180 degrees with respect to the lower forming die 7. In such a case, the rotary actuators are mounted on the base structure 1 and drivingly connected to the respective link members 3b, 3b to rotate them about each of the support shafts 3c, 3c and the configuration of guide tracks 5, 5 is made in a parabolic shape. Alternatively, a long stroke hydraulic cylinder may be replaced with the respective hydraulic cylinders 2, 2 without provision of the linkage mechanism 3. In this case, the long stroke hydraulic cylinder is mounted on the base structure at each inside of the upright side plates 4, 4 in such a manner as to directly move the respective support shafts 6c, 6c of the support frame 6.

Furthermore, the respective columnar rollers of guide bars 6d, 6d may be replaced with a spherical roller which is arranged to be in contact with the inside faces of guide rails 5a, 5b, 5c and with the respective inside surfaces of the upright side plates 4, 4. In such a modification, the guide rollers 6e, 6e may be eliminated since the spherical rollers act to prevent lateral movements of the support frame 6.

As is understood from the above description, the support mechanism of the preferred embodiment is characterized in that the pair of laterally spaced hydraulic cylinders 2, 2 are mounted on the base structure 1 to support the movable support frame 6 through the linkage mechanisms 3, 3 and that the guide tracks 5, 5 are provided on the pair of laterally spaced parallel upright side plates 4, 4 to guide upward and downward movements of the support frame 6. With such arrangement of the hydraulic cylinders 2, 2 and guide tracks 5, 5, the support frame 6 for the upper molding die 8 can be constructed lighter in weight and small in size and arranged as lower as possible. This is useful to operate the support frame 6 with less power at a higher speed and to facilitate access of the operator to the upper forming die 8 placed in its fully open position. Furthermore, the guide bars 6d, 6d of support frame 6 can be assembled with the guide tracks 5, 5 in a simple construction. It is also advantageous that the split guide rails 5a, 5b, 5c can be quickly exchanged with new ones for repair of the guide tracks 5, 5 or another guide rails suitable for another upper forming die.

What is claimed is:

1. A support mechanism for supporting thereon a set of upper and lower forming dies to be opened and closed in a forming process, comprising:

a base structure for mounting thereon said lower forming die;

a pair of opposed upright side plates fixedly mounted on said base structure in parallel to one another;

a pair of guide tracks provided on respective inside faces of said upright side plates, said guide tracks each being composed of a pair of parallel guide rails;

a pair of actuators mounted on said base structure at a position adjacent said upright side plates;

a movable support frame arranged between said upright side plates and located above said lower forming die on said base structure for supporting said upper forming die thereon, said support frame having a pair of support shafts secured to opposite sides of said support frame and a pair of guide bars secured to said opposite sides of said support frame and slidably engaged with grooves formed by the respective parallel guide rails of said guide tracks; and means for supporting said support shafts of said support frame and transmitting the motion of said actuators to said support shafts to move said support frame along said guide tracks under guidance of said guide bars.

2. A support mechanism as claimed in claim 1, wherein said actuators each are a hydraulic cylinder pivotally mounted on said base structure, and wherein said means for supporting said support shafts of said support frame comprises a pair of link mechanisms mounted on said base structure at a position adjacent said respective upright side plates for supporting thereon said support shafts of said support frame and operatively connected to said hydraulic cylinders to move said support frame along said guide tracks under guidance of said guide bars.

3. A support mechanism as claimed in claim 2, wherein said link mechanisms each include a bracket mounted on said base structure at a position adjacent said respective upright side plates, a pair of axially spaced inside and outside link members rotatably mounted on said bracket and connected to one another by means of a pivot shaft which is pivotally mounted on a piston rod of said hydraulic cylinder, said inside link member being formed with an elongated hole slidably engaged with said respective support shafts of said support frame.

4. A support mechanism as claimed in claim 1, wherein a pair of guide rollers are rotatably mounted to each of said opposite sides of said support frame and in contact with said respective inside faces of said upright side plates.

* * * * *

UNITED STATES PATENT AND TRADEMARK OFFICE
CERTIFICATE OF CORRECTION

PATENT NO. : 5,362,225
DATED : November 8, 1994
INVENTOR(S) : KITANO et al.

It is certified that error appears in the above-indentified patent and that said Letters Patent is hereby corrected as shown below:

Delete drawing Fig. 5, and substitute therefor the drawing Fig. 5, as shown on the attached page.

Signed and Sealed this

Twenty-fifth Day of April, 1995

Attest:

BRUCE LEHMAN

Attesting Officer     Commissioner of Patents and Trademarks

Fig. 5